March 6, 1951     H. ERNST, JR     2,543,838
OXYGEN REMOVAL FROM ABSORPTION OILS
Filed Sept. 4, 1947
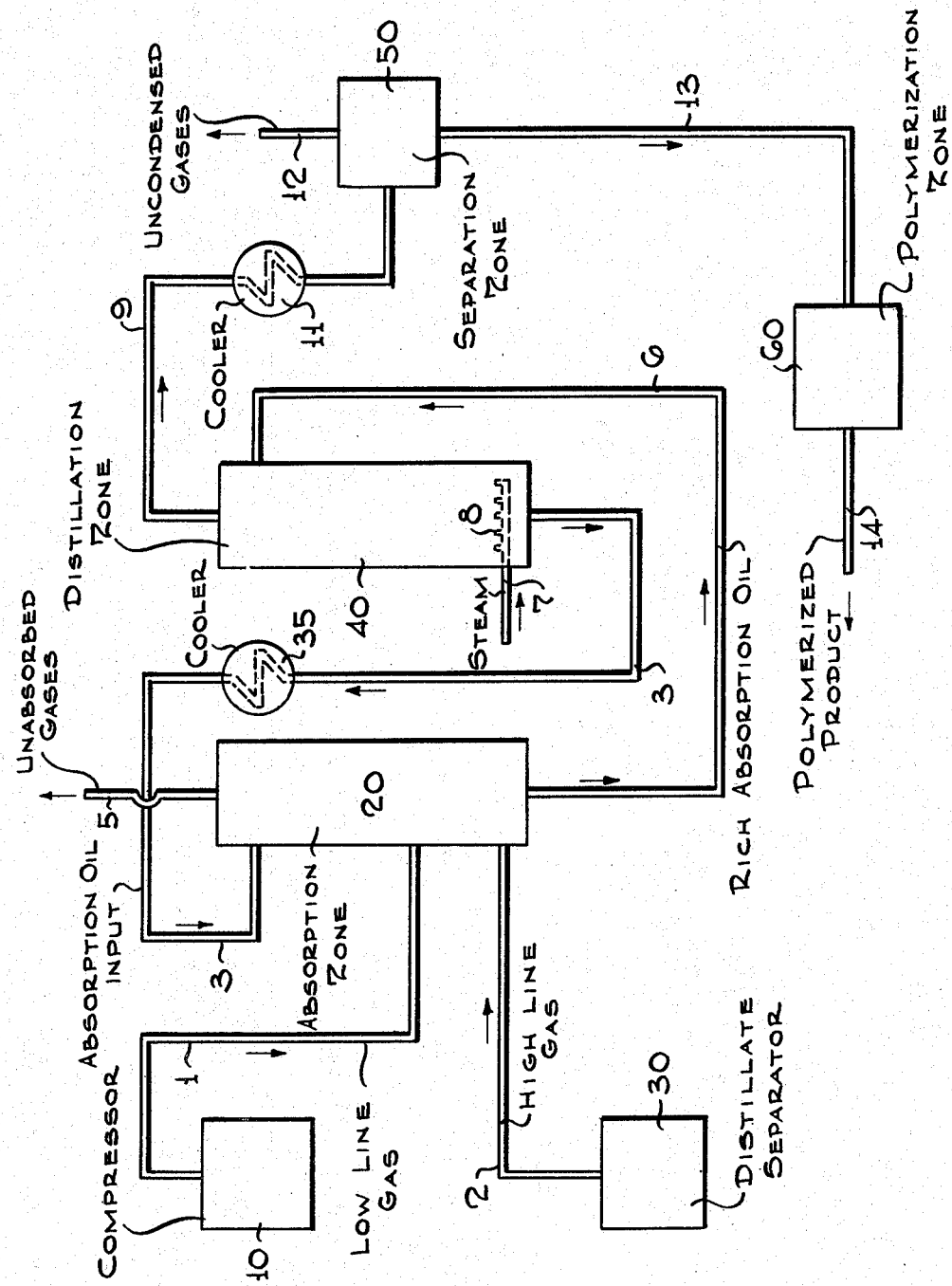
Henry Ernst, Jr. Inventor
By W. O. J. Heilman Attorney Patented Mar. 6, 1951

2,543,838

UNITED STATES PATENT OFFICE 2,543,838

OXYGEN REMOVAL FROM ABSORPTION OILS

Henry Ernst, Jr., Roselle, N. J., assignor to Standard Oil Development Company, a corporation of Delaware Application September 4, 1947, Serial No. 772,103

4 Claims. (Cl. 183—115)

The present invention is concerned with an improved process for the removal of oxygen from absorption naphtha. The invention is more particularly concerned with an improved method for the treatment of gases formed in the refining of petroleum oils in order to render these gases more satisfactory for employment in a polymerization process, especially when utilizing a phosphoric acid type catalyst. In accordance with the specific embodiment of my invention, I segregate so-called, "low line" gases which contain oxygen from so-called "high line gases" which are substantially free of oxygen, and introduce these gases into an absorption tower, down which an absorption oil is flowing, in such a manner that the low line gases are introduced into an intermediate point in the absorption tower while the high line gases are introduced at the bottom of the absorption zone. Thereby, desirable constituents are absorbed from the low line and high line gases, while unabsorbed constituents of the high line gases strip dissolved oxygen from the absorption oil.

In the refining of petroleum oils, relatively large quantities of gases, varying widely in their hydrocarbon analyses are produced. These gases include various concentrations of methane, ethane, ethylene, propane, propylene, butanes, butylenes, pentanes, amylenes, and high boiling hydrocarbons, some of which, due to their physical properties, may be readily included in gasoline and some of which may be further processed to produce other desirable hydrocarbon constituents. For example, it is known to treat such streams so as to segregate propane, butanes, pentanes, and their respective olefins, which constituents are then subjected in a subsequent stage to a polymerization catalyst. These valuable hydrocarbon constituents may be recovered from the so-called "wet gases" secured in the refining of petroleum by contacting said wet gases with an absorbent oil under suitable temperature and pressure conditions. In the usual oil absorption recovery operation, "lean" absorption oil is circulated in a countercurrent bubble cap tower, or similar equipment, in which it contacts an upflowing stream of refinery gases containing these valuable constituents. The lean absorption oil is usually introduced at the top of the absorber, while the refinery gases are introduced in the bottom of the absorption zone. In these absorption operations, the method usually employed is to select the lowest boiling hydrocarbon which it is desired to absorb and then to adjust the operations to absorb the desired amount of this hydrocarbon. In an efficiently designed absorption tower, the partial pressure of this hydrocarbon in the absorption oil at the point of withdrawal will be substantially equivalent to the partial pressure of this hydrocarbon in the entering gas. This lowest boiling hydrocarbon, generally termed the "key" component, may be butane, propane, ethane, or their respective olefins. Thus, the partial pressure of the key component in the hydrocarbon rich absorption oil, at the point of withdrawal of the absorption oil is substantially equivalent to the partial pressure of the key component in the entering gas.

As pointed out heretofore, in the refining of petroleum oils various gas streams containing wide analyses are produced. For example, a so-called "low line" gas is produced, which gas contains various percentages of oxygen. These streams are usually evolved from distillate drums of crude stills, rerun stills, low pressure flash drums of thermal and catalytic cracking units, and miscellaneous tank gases. These gases are collected under little or no positive pressure so that air leakage into the collection system generally occurs. The low line gas stream generally contains from 0.2% to 10% oxygen and usually is under a pressure before compression of from 1 pound/sq. in. vacuum to 5 pounds/sq. in. positive pressure. The analysis of a typical low line gas from refinery operations is shown in Table I.

TABLE I

*Low line gas from crude distillation tower*

| | Percent |
|---|---|
| Fixed gas+methane | 10.7 |
| Ethane | 7.4 |
| Ethylene | 0 |
| Propane | 16.3 |
| Propylene | .9 |
| Butane | 22.2 |
| Butylene | .8 |
| Pentane | 13.7 |
| Pentene | .4 |
| Hexane+ | 5.7 |
| $CO_2+H_2S$ | 19.2 |
| Oxygen | 3.3 |

On the other hand, other refinery operations produce so-called, "high line gas." This high line gas is evolved from various cracking operations, such as reforming, gas oil cracking, and viscosity breaking. The analysis of a typical high line gas is given in Table II.

TABLE II

*Wet high line gas from gas oil cracking unit*

|  | Per cent | Per cent |
| --- | --- | --- |
| $C_1$ Hydrocarbons | 56.0 | 50.8 |
| $C_2$ Hydrocarbons | 24.5 | 22.3 |
| $C_3$ Hydrocarbons | 13.4 | 12.2 |
| $C_4$ Hydrocarbons | 4.7 | 4.3 |
| $C_5$ Hydrocarbons | 1.1 | 1.0 |
| $C_6$ Hydrocarbons | 0.3 | .3 |
| Oxygen | 0 | 0 |
| $CO_2 + H_2S$ | 0.2 | 0.2 |

In general high line gases are maintained under pressure in the range of about 25 to 250 lbs./sq. in. (gauge), and preferably in the range of about 50 to 200 lbs./sq. in. (gauge).

As discussed above, these low line and high line gases are processed in a manner to recover desirable constituents therefrom. Although, various methods are employed, the general and usual procedure is to treat the respective streams in absorption zones wherein the gas streams are countercurrently contacted with downflowing absorption oil either as combined streams, or separately. Generally the high line gas and the low line gas are subjected to different absorption conditions due to the different analyses of the respective gases. For example, low line gas of the character described, may be treated in an absorption zone with an oil having a gravity in the range from 25 to 50 A. P. I. and an oil rate of from 20 gallons of oil to 50 gallons of oil per 1000 standard cubic feet of gas, and at a temperature in the range from 60° F. to 130° F., and at pressures of 25–250 lbs./sq. in. gauge.

The same general range of conditions may be applied to the high line gases, but the combination of specific conditions is generally made to give a higher percentage of absorption, since the high line gases generally have greater amounts of olefins. This may be carried out by employing a high pressure and a low pressure absorber in parallel. The high line gas is introduced into the high pressure absorber, while the low line gas is introduced into the low pressure absorber. The combined absorbent oil stream is then passed to a stripping zone where the desirable constituents are removed from the oil.

While the procedures described above have been entirely satisfactory for segregating hydrocarbon constituents for incorporating the same in gasoline and the like, they have not been entirely satisfactory for segregating hydrocarbons containing from 3 to 5 carbon atoms in the molecule, which constituents are to be subsequently passed to a polymerization reaction zone. This is particularly the situation when the polymerization process is conducted in the presence of a phosphoric acid type catalyst. As this catalyst is adversely affected by the presence of oxygen in the incoming feed stream, it is necessary, in addition to the above steps, to remove the oxygen normally absorbed by the absorbing oil. Previous practice for removing this oxygen has been to cause oxygen stripping by heating the oil in a lower section of the absorber or in an external stripping zone. This procedure has the disadvantage of building up an appreciable recycle gas stream which decreases recovery or increases the lean oil requirement, as well as adding equipment and consequent operating cost.

In accordance with my invention, I propose to handle the low line gas stream containing oxygen and the high line gas stream substantially free of oxygen, by introducing both streams into an absorption tower in such a manner that the stream containing oxygen is introduced at an intermediate point in the absorption zone while the stream substantially free of oxygen is introduced at the bottom or lower section of the absorption zone. Any oxygen absorbed from the low line gas in the upper part of the tower will then be stripped by unabsorbed gases of the high line gas in the lower part of the tower.

The process of my invention may be readily understood by referring to the drawing illustrating one embodiment of the same. Low line gas containing 0.2% to 10% oxygen, which for the purpose of illustration, is obtained from the low pressure flash drum of a crude distillation unit, is compressed in low pressure compression unit 10. No specific details are shown as to the nature or operation of the gas compression unit, and it is understood that these may be widely modified, depending upon the particular type of operation being conducted. The compressed low line gas, with or without any resulting condensate, is introduced into the middle area of absorption zone 20 by means of line 1. High line gas obtained from a thermal cracking unit operating with, for example, a 100 p. s. i. g. distillate separator 30, is introduced into the lower area of absorption zone 20 by means of line 2. These gases flow upwardly in absorption zone 20 and contact a downflowing absorption oil which is introduced into the upper section of zone 20 by means of line 3. Absorption zone 20 may contain any suitable number of distributing and contacting means as for example bubble cap plates, contacting masses, and the like. It is preferred that the point of introduction of the low line gas be approximately one third of the distance up the tower.

The downflowing absorption oil first contacts the low line gas containing oxygen in the upper area of zone 20. As the absorption oil flows past the point of introduction of the low line gas, it contains dissolved therein the desired constituents of the low line gas, which for the purpose of illustration, are assumed to be propane, ethane, butane, and their respective olefins. The absorption oil, likewise, contains dissolved therein an amount of oxygen depending upon the concentration of the oxygen in the low line gas. In accordance with my invention, this rich absorption oil containing undesirable oxygen dissolved therein, then contacts upflowing high line gas in the lower area of the absorption zone. Desirable constituents of the high line gas are then absorbed while at the same time substantially all of the oxygen is stripped out of the absorption oil by the unabsorbed constituents of the high line gas such as methane or ethane.

Dry gases containing oxygen, methane, and other undesirable constituents are removed overhead from absorption zone 20 by means of line 5. The rich absorption oil, substantially free of oxygen and containing dissolved therein desirable hydrocarbon constituents, is removed from the bottom of absorption zone 20 by means of line 6 and introduced into the upper section of the distillation zone 40. Temperature and pressure conditions are adjusted in distillation zone 40 to substantially completely free the absorption oil of dissolved hydrocarbon constituents. The absorption oil is withdrawn from the bottom of distillation zone 40, is cooled in cooling zone 35, and is introduced into the top of absorption zone 20 by means of line 3 as hereinbefore described. A stripping medium, as for example, steam, may be introduced into the bottom of distillation zone 40 by means of line 7 and suitable jet 8.

It is to be understood that the absorption zone and the distillation zone may comprise any suitable number and arrangements of units. For example, the distillation zone may comprise a high and low pressure still arrangement, or the absorption zone may consist of two or more absorbers. The essence of my invention is to first contact the low line gas containing oxygen, with an absorption oil and then to subsequently contact this partially rich absorption oil with a high line gas containing desirable constituents, which high line gas is substantially free of oxygen. The constituents of the high line gas which are not absorbed thus exert a stripping action which removes the dissolved oxygen from the absorption oil.

The hydrocarbon constituents removed from the absorption oil and distillation zone 40 are withdrawn overhead by means of line 9, condensed in cooler 11 and introduced into separation zone 50. Uncondensed gases are removed from separation zone 50 by means of line 12, while the desired liquid hydrocarbon product is removed by means of line 13.

This liquid product which is free of oxygen, may be used in any process wherein it is desirable that no oxygen be present. It is particularly desirable, however, in a non-selective polymerization operation. In accordance with this adaptation of my invention, I introduce the liquid hydrocarbons from separation zone 50, after separating and washing a light olefin containing cut in conventional fractionating and washing facilities, into polymerization zone 60 which contains a phosphoric type catalyst. Temperature and pressure conditions in zone 60 can be the order of 400–500° F. and 300–2000 p. s. i. g. The polymerized product is withdrawn from zone 60 by means of line 14 and handled in any manner desirable. Usually, this product is blended in various motor fuels. The advantage of operating such a polymerization process with oxygen free feed may be appreciated from the following data showing the catalyst life in relation to the oxygen content of the feed stock:

| Oxygen Content, Molar P. P. M. | Catalyst Life, Gals. Product/lb. Cat. |
|---|---|
| About 0 | 150 |
| 100 | 40 |
| 200 | 25 |
| 500 | 10 |

As previously discussed, my invention comprising a particular arrangement and sequence of stages produces an oxygen-free liquid product from low line gases containing oxygen and from high line gases free of oxygen. This is accomplished by allowing the absorption oil employed in treating the low line gases to be further contacted with the oxygen-free gases consisting of high line gases. By operating in this manner, the lower section of the absorption zone serves to not only strip oxygen from the upper section fat oil, but also serves as additional absorber stages for the oxygen-free wet gas. The absorbers may be operated between 30 and 300 lbs. per sq. in., and at a temperature in the range from 60° F. to 130° F.

The process of my invention is not to be limited by any theory as to mode of operation, but only in and by the following claims in which it is desired to claim all novelty insofar as the prior art permits.

What is claimed is:

1. Improved process for segregating hydrocarbon constituents free of oxygen from two hydrocarbon streams, one of which streams contains oxygen, comprising the steps of contacting a first hydrocarbon stream containing oxygen with an absorption oil under conditions to absorb hydrocarbon constituents, then contacting said absorption oil containing absorbed hydrocarbon constituents from said first hydrocarbon stream with a second hydrocarbon stream free of oxygen under conditions to absorb hydrocarbon constituents from the said second stream, and thereafter recovering said absorbed hydrocarbon constituents from the absorption oil.

2. Process defined by claim 1 wherein said first hydrocarbon stream containing oxygen is a stream evolved from low pressure distillation equipment maintained at a subatmospheric pressure, and said second hydrocarbon stream free of oxygen is evolved from cracking equipment under a superatmospheric pressure.

3. In preparing the feed to a catalytic polymerization process the improvement which comprises contacting a refinery gas stream containing oxygen and $C_2$ to $C_5$ hydrocarbons with an absorption oil, then contacting the absorption oil with an oxygen free refinery gas stream containing $C_2$ to $C_5$ hydrocarbons, and thereafter recovering absorbed $C_2$ to $C_5$ hydrocarbons from the absorption oil.

4. Process for segregating hydrocarbon constituents substantially free of oxygen from two hydrocarbon gas streams, one of which contains oxygen, comprising the steps of: introducing an absorption oil into the top of an absorption zone, and withdrawing the absorption oil from the bottom of the absorption zone, introducing a first hydrocarbon gas stream containing oxygen into an intermediate portion of the absorption zone, and introducing a second hydrocarbon gas stream free of oxygen into the bottom of the absorption zone, whereby said absorption oil in passing downwardly through the said zone absorbs constituents successively from said first and second streams and whereby oxygen absorbed from said first stream is stripped from the absorption oil by the successive contact with the said second stream, subsequently distilling absorbed constituents from the absorption oil and recycling the oil to the absorption zone.

HENRY ERNST, Jr.

REFERENCES CITED

The following references are of record in the file of this patent:

UNITED STATES PATENTS

| Number | Name | Date |
|---|---|---|
| 1,725,925 | Kent | Aug. 27, 1929 |
| 2,160,163 | Nichols et al. | May 30, 1939 |
| 2,216,552 | Gage et al. | Oct. 1, 1940 |
| 2,351,167 | Ware | June 13, 1944 |